INVENTOR
JAMES M. CUNNINGHAM
BY *Francis V. Giolma*
ATTORNEY

United States Patent Office 3,312,174
Patented Apr. 4, 1967

3,312,174
VARIABLE CYCLE CONTROL SYSTEM FOR A HIGH SPEED PRINTER
James M. Cunningham, Endwell, N.Y., assignor to International Business Machines Corporation, Armonk, N.Y., a corporation of New York
Filed Dec. 23, 1965, Ser. No. 516,033
6 Claims. (Cl. 101—93)

This invention relates to printing and more particularly to a high speed printer apparatus.

While not necessarily limited thereto, the present invention has particular utility to a chain printer apparatus of the type shown in U.S. Patents 2,918,865 of E. R. Wooding, issued Dec. 29, 1959; 2,993,437 of F. M. Demer et al., issued July 25, 1961; and 3,066,601 of H. E. Eden, issued Dec. 4, 1962.

In general, the chain printer apparatus as described in the above patents comprises a print mechanism and controls designed to print data a line at a time on a record medium. The print mechanism comprises a constantly moving type chain or train, a plurality of hammers arranged in a row parallel to a straight portion of the path of travel of the type, and means for guiding and feeding a record medium between the hammer array and the type chain. The type chain may comprise plural type elements attached to a flexible belt or arranged in a train or the like. Each type element bears one or more type characters and the elements are arranged on the belt so that one or more character sequences in a continuous loop are formed. Where plural sets are used, the sets are usually identical in number and arrangement of characters. The print hammers are arranged in a linear array so that one hammer is located at each print position in a line. For example, in commercial embodiments of the chain printer, there are 100 or 132 print hammers spaced uniformly at .100 inch. In one embodiment, the characters on the chain have a spacing which is 1.5 times the spacing of the hammers. In such arrangement, within the span of the hammer array every other character on the chain registers with every third print hammer. Since the type chain is moving constantly, the characters coming into alignment with various hammers are constantly changing. The process whereby the characters move into alignment is referred to as scanning. The process whereby only a portion of the characters on the chain within the span of the hammer array move into alignment, where the characters in alignment are separated by characters not moving into alignment in the same interval is referred to as the subscan (also called subcycle) process. For the purpose of definition, the interval of time for all hammers to be scanned by one type character of the type chain is a print scan, which with the 1.5 spacing ratio mentioned above is equal to three subscans.

Printing occurs by selective operation of various hammers in the array in timed relation with the arrival of desired characters at predetermined print positions. The printer control for accomplishing this preferably comprises a magnetic core storage device, means for identifying the characters in the sequence in which they appear on the type chain, means for selecting hammers as the characters register therewith, means for timing the various control and print functions, and means for initiating and terminating the printer operation, paper feeding and data storage transfers. The core storage device which may be part of the data processing system or may be separate buffer storage for receiving data from the central processor, stores one line of data at a time. Within the core storage device, an individual core storage position is provided for each hammer position and there will be as many storage positions as there are hammers. When a line of data is stored in the storage device, an instruction is received to print. Data is then read from the storage one character at a time by an address read-out means. In the preferred form, the read-out means scans the core storage positions in the same sequence in which the characters are alignable with the hammer positions. Thus, for the 1.5 type character pitch previously mentioned, every third position of storage is scanned during a subscan operation, and intermediate storage positions are scanned in the same manner in subsequent print subscans. During the course of a print scan every position of data storage is scanned once. The process may be repeated as many times as there are different characters in the type set. Simultaneously with the storage read-out operation, the type identifying means, which is a character code generator such as a binary counter or the like, is generating a sequence of signals which identify those characters which are registering with the print hammer during the print subscans. The data signals read out of the various storage positions are compared with the character signals generated by the character generator for the corresponding print positions. When the comparison circuit detects an identity in signals from the character generator and the data storage, an equal compare signal is produced and used for sending a hammer operate signal through the hammer selection means to the addressed hammer. The timing for the scanning of storage and the stepping of the type identifying counters is provided by a pulse generator driven in synchronism with the type chain, and a cyclically operable electronic clock. The pulse generator is designed to generate a timing pulse at the beginning of each print subscan. The timing pulse initiates clock operation whereupon a series of pulses is generated by the clock, each clock cycle to step the type tracking counters, advance the storage read-out and hammer selection means, and fire hammers in case of an equal compare signal. In the preferred form the clock is designed to repeatedly generate a sequence of pulses whereby address, compare, and hammer firing functions occur in sequence along with various checking functions as described in the above Eden patent.

A principal characteristic of the chain printer apparatus described in the above patents is that the print cycle, i.e., the time during which printing occurs, is fixed even though the amount of data in successive print lines may vary. Thus the output rate of printing remains fixed regardless of variations in the amount of data in storage for various lines. In a copending application of Earl M. Bloom, Jr. and Genadij Krysiuk, Ser. No. 415,237, filed Dec. 2, 1964, and assigned to the same assignee as the present invention, a variable print cycle printer apparatus is described and claimed. In general, the embodiment shown in the Bloom et al. application describes an arrangement in which a print cycle control plane of cores is used as a counter to provide a Line Full signal for enabling the carriage controls to advance the record medium whenever the number of characters to be printed in a line is printed, thus terminating a print operation. Specifically a counter device or the like is provided which monitors the number of print scans performed by the printer control and print mechanism, and this counter is used to limit the number of print cycles to a predetermined minimum consistent with the duty cycle of the most critical components, so that a safety means is provided which permits variable cycle print operation to be obtained without exceeding the duty cycle of the printer apparatus.

The purpose of using printers having a preferred character feature which utilizes a plurality of characters or sets of characters that find more frequent usage, is to speed up the printing process without requiring operation of the machine at higher than a predetermined maximum rate. When such an arrangement is used with a print line complete control having a definite minimum number of print scans per line for limiting the printing rate, this may impose an unnecessary limitation, at times, as the maximum print rate can be exceeded for occasional bursts without any harm resulting, thus permitting in effect a higher instantaneous, and hence higher overall average print rate, while still effectively maintaining a safe maximum average value.

It is therefore an object of this invention to provide for governing the print rate of an on-the-fly printer to provide an average print rate limit which may be exceeded for short periods at spaced intervals.

Another object of the invention is to provide for controlling the print rate of a chain or train printer to utilize the advantage of higher speeds offered by a preferred character feature, without permitting the higher speeds to be sustained for a long enough interval to cause damage to any of the printer components.

It is also an object of this invention to provide timing means for permitting a predetermined maximum time interval during which a printer can be operated at maximum speed, while permitting longer operation at lesser speeds which may still be in excess of a predetermined overall average rate.

Yet another object of the invention is to provide for averaging the print line rate of a printer over a timed interval and interrupting operation thereof only if the average rate for the interval exceeds a predetermined value.

It is also an important object of this invention to provide for so limiting the maximum print rate of an on-the-fly printer as to permit occasional bursts of printing at higher than the average permissible rate.

In practicing the invention in accordance with one embodiment thereof, each advance of the carriage of the printer which operates in the preferred character mode so that a print line may terminate in fewer than the usual number of scans, places a charge on a capacitor. A discharge circuit is provided for discharging the capacitor at a predetermined rate so that at a predetermined print rate there is no build up of the charge. At print rates in excess of the predetermined rate the charge on the capacitor builds up or increments, and when it reaches a predetermined level it is effective to terminate the printing process and prevent further printing operations until the elapse of sufficient time to prevent damage to components from overheating.

The foregoing and other objects, features and advantages of the invention will be more readily apparent from the following more particular description of preferred embodiments of the invention as illustrated in the accompanying drawings.

Figure 1:
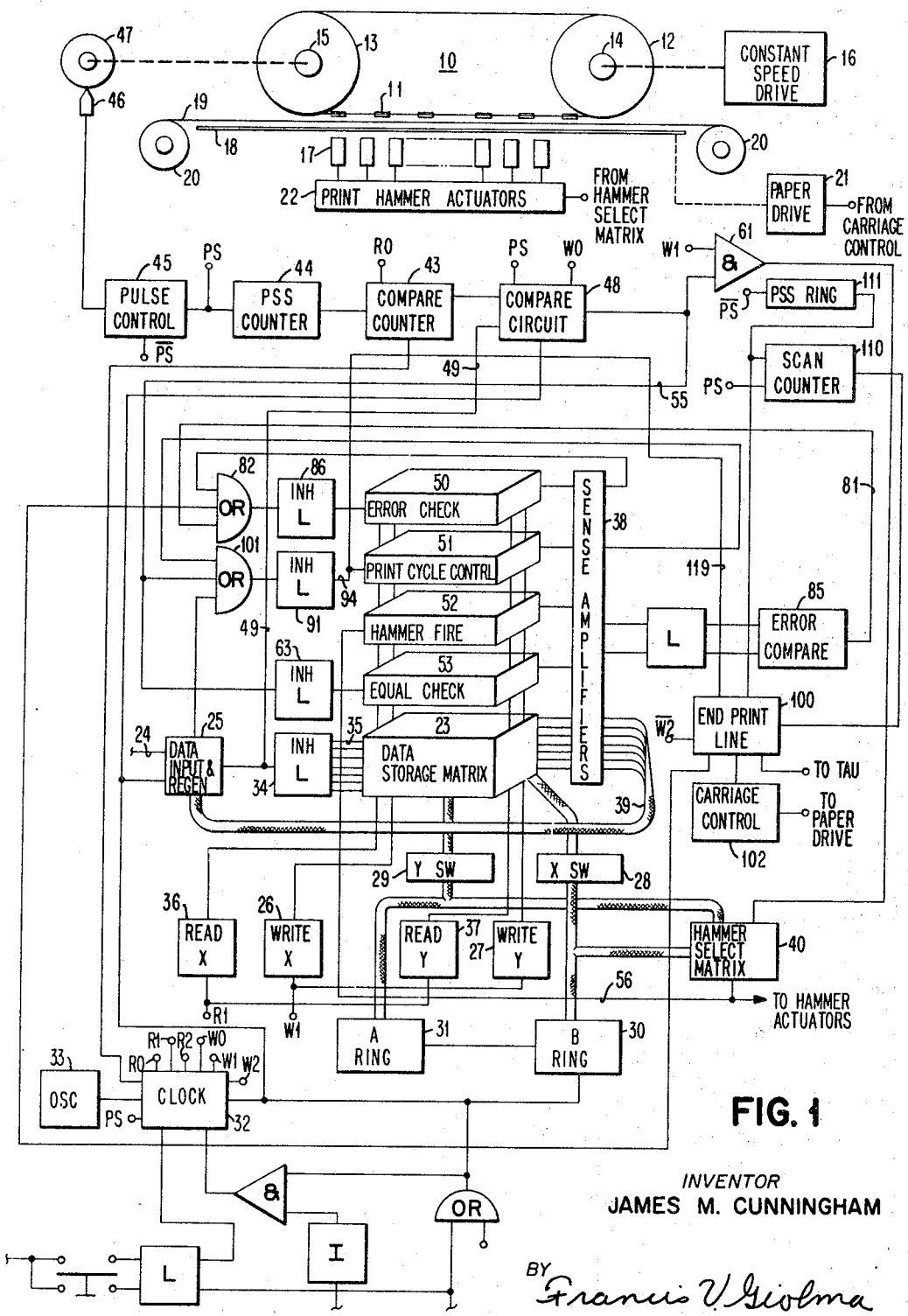
FIG. 1 is a logic block diagram of a printer control in combination with a print mechanism shown in schematic form and illustrating a high speed printer apparatus with which the improved print cycle control feature of the present invention may be used.

As shown in FIG. 1, a printer of the general type shown in the aforementioned patents comprises a type chain 10 having a plurality of type elements 11 attached to a flexible carrier formed in a loop and movably supported on a pair of spaced drive wheels 12 and 13. A drive shaft 14 for the wheel 12 is connected to a constant speed driving means 16 of any conventional type. The type elements 11 contain one or more engraved characters and are arranged in one or more sets of type characters so that a continuous type loop is formed. Associated with the type chain 10 are a plurality of uniformly spaced print hammers 17 arranged in a linear array parallel with the front straight portion of the type chain 10. The longitudinal spacing of the print hammers 17 is such that one hammer is provided for each position at which printing impressions are to be formed so as to make a line of print. The longitudinal spacing of the characters on the type chain 10 is in the preferred arrangement 1.5 times the spacing of the hammers 17 as is more fully described in the patent to Demer et al. Thus characters are alignable with only a portion of the hammers, for example, one-third, for any one position of the type chain. In practicing the present invention, it is further preferable that the characters are spaced an additional increment so that alignment of the type characters occurs in a serial manner in a longitudinal direction. The additional increment is a space increment equal to the distance the chain moves longitudinally during the time the controls perform their control function associated with the printing of a single character.

Located between the print hammers 17 and the chain 10 is a record medium such as a continuous paper document 18 and an ink ribbon 19. The ink ribbon 19 is fed in any well known manner between a pair of spools 20. The paper 18 is fed transversely to the direction of motion of the type chain 10 by any well known means such as forms feed tractors (not shown) which are connected to a drive means 21 which may be of any well known type such as is shown in U.S. Patent 2,531,885 of A. W. Mills et al., issued Nov. 28, 1950. During printing, the paper 18 is held stationary. Upon termination of a printing operation, the paper 18 is shifted one or more lines by the paper drive 21 to a new line position for the next print line. The print hammers 17, which may be of any well known type, are preferably inertia-rebound hammers operated by individual actuators 22 such as solenoids or the like which may be energized by a hammer driver circuit 42 (see FIG. 2).

When printing, the action of the described print mechanism is as follows: With the type chain 10 moving at a constant linear speed the type characters serially scan the print hammers 17 in a series of alignment sequences. With the spacing ratio specified above, every other type character along the print line becomes aligned serially with every third print hammer. The action whereby only a portion of the hammers are scanned is referred to as a subscan. For a spacing ratio of 1.5, three subscans are required to complete one print scan where each hammer 17 will have one character aligned therewith. Further details of the subscan (otherwise called subcycle) process may be obtained from said Demer et al. patent.

During the course of printing a line of data, the print hammers 17 are selectively operated by the actuators 22 in timed relation with the arrival of characters desired to be printed. A printer control system for selectively operating the print hammers 17 comprises a multi-position data storage device such as a multi-plane magnetic core storage matrix 23 having as many positions of storage as there are print hammers 17. The information to be printed in the different print positions of a line of data by hammers 17 is stored in multiple bit form with each bit stored in a magnetic core arranged in a particular position of the various core planes of matrix 23. For example, matrix 23 would have seven core planes, one for each bit of a seven bit binary code and each plane comprises plural cores arranged in a row and column configuration. A specific core plane arrangement might comprise 140 cores arranged in 14 rows of ten cores each to accommodate a corresponding number of hammers.

The information to be printed is written into different positions of matrix 23 from a data input channel 24 which connects a data input device (which may include a central processing unit) to an input and regenerate circuit 25. The writing of information in the various storage locations of matrix 23 is performed in any well known manner and may include X and Y write drivers 26 and 27, respectively, which selectively energize write windings of different cores in matrix 23 that are addressed by a plurality of X and Y switches 28 and 29 operated under the control of B (units) ring 30 and A (tens) ring 31. The stepping of the address ring 30 is under control of an electronic clock 32 and oscillator 33 and the stepping of ring 31 is effected through ring 30. The writing operation is completed when the X and Y write drivers are operated in response to a W1 clock signal in combination with a Read-in signal. Inhibit latches 34, which are energized or set on read-in by clock pulse R0 and selectively reset in response to data input over channel 24, have output windings 35 connected to selectively control inhibit windings of the core in the multiple planes of matrix 23 in opposition to the write lines. As is well known in the art, those inhibit lines which are energized from lines 35 will oppose switching of the write windings energized by the X and Y write drivers 26 and 27. Addressed cores having non-energized inhibit lines are switched from a first to a second state by the energizing of write windings through X and Y drivers 26 and 27.

Read-out of information from the various storage positions of matrix 23 for printing is also effected in a manner well known in the art. The different core positions that are addressed by the X and Y switches 28 and 29 under the control of the A and B rings 31 and 30, are energized by X and Y read drivers 36, 37, respectively, in response to a clock signal R1 and a Print Scan signal. Outputs upon read-out from the sense windings of the cores are fed through sense amplifier 38 via a feedback connection 39 to regenerate circuit 25 to inhibit latches 34. The read-out from the regenerate circuit 25 is also fed to compare circuit 48 via connection 49. At clock time W1, the information in latches 34 is rewritten into the same position of storage by the X and Y write drivers 26 and 27 before the next position of storage is addressed.

With the 1.5 type-to-hammer spacing ratio, the addressing and read-out from the storage positions of matrix 23 preferably occurs in the same sequence that characters of the moving chain 10 become aligned with print hammers 17. That is, during a subscan operation of the type chain 10, the matrix 23 is addressed and data read out from storage positions corresponding with the positions of hammers having type characters aligned therewith during the subscan. Likewise, positions of storage not addressed on a first subscan are addressed on successive subscans so that on completion of a print scan, each position of matrix 23 is read out once.

During read-out, the hammers 17 are addressed in the same manner and sequence as matrix 23 is scanned. For that purpose address rings 30 and 31 are connected to a hammer select matrix 40 which preferably comprises a plurality of diode circuits 41 arranged in a row and column configuration corresponding to the arrangement of cores in a core plane of matrix 23. Plural hammer driver (HD) circuits 42 connected to the print hammer actuators 22 are connected to various diode circuits 41 of the hammer select matrix 40. Thus, when a particular location of storage of matrix 23 is addressed by rings 30 and 31, corresponding to a hammer position before which a type character is in alignment, the corresponding hammer drive circuit 42 for operating the print hammer actuator for that same hammer is addressed at the same time.

The control system for selective hammer operation further includes character generator means for identifying characters in the various positions of the type chain 10 during the course of the various subscans. One embodiment of a character identification means comprises a compare circuit 43 connected to a print subscan counter 44 which in turn is connected to the output pulse control means 45 having an input to a pulse generator including a transducer 46 and timing disk 47 connected to shaft 15 of drive wheel 13. The timing disk 47 is preferably a magnetic drum having a plurality of slots in the periphery thereof. The transducer 46 senses the change in reluctance produced by the slots. The slots are spaced to generate a pulse at the beginning of each subscan, i.e., when the first character of a subscan group on type chain 10 is at the first subscan print position. An additional slot is provided between two regular subscan slots to generate a home pulse used for checking purposes. Specific details of the pulse control circuitry 45 may be obtained by reference to the aforesaid Eden patent. Generally speaking, the pulse control circuitry comprises pulse amplifiers and shapers as well as a home pulse discriminator. The home pulse is generated at the time when a particular character for a particular hammer position is being identified by the counters 43 and 44. If at the home pulse time the counters are set in a character position different from the predetermined character, the pulse control 45 indicates an error condition for the counters and an error indication to printer control is generated (at the next PSS pulse).

Character identification is provided by the print subscan counter 44 to identify the first character in alignment with a print hammer 17 at the beginning of each subscan. The compare counter 43 is set by the subscan counter 44 to identify the first character each subscan and in response to a sequence of pulses from clock 32 generates code signals representing all the other characters of the subscan group in alignment with the remaining print hammers 17 during a subscan. Both the print subscan counter 44 and compare counter 43 are binary counters interconnected so that the character setting of the subscan counter 44 is transferred to the compare counter 43 on occurrence of a subscan pulse from transducer 46 through pulse control 45. Thereafter during the course of a subscan, a specific pulse in each clock cycle from clock 32 steps the compare counter 44 in timed relation with the address of data matrix 23 and hammer select matrix 40. For example, the R0 clock pulse in each clock cycle in combination with a PS signal advances the compare counter 43. The output of the compare counter 43 is fed to a comparison circuit 48 which has a second input on line 49 from the inhibit latches 34. Thus when the data from a matrix 23 storage position is placed in latches 34 through feedback connection 39, the same data is communicated on line 49 to compare circuit 48 and a comparison made with the character signal produced by compare counter 43. Comparison is made on W0 clock pulses in combination with a PS signal. In the case of an identity, a memory compare equal pulse gates a W1 clock pulse through AND circuit 61 to hammer select matrix 40. This activates the specific hammer drive circuit 42 (see FIG. 2) corresponding to the storage hammer position at which the memory compare equal occurred to energize the appropriate hammer actuator 22 of a print hammer 17.

Associated with data storage matrix 23 are a plurality of additional core planes 50, 51, 52 and 53. The core planes have a row and column arrangement corresponding with the arrangement of core planes of matrix 23. Briefly, the additional core planes comprise print error check plane 50, print cycle control plane 51, hammer fire check plane 52, and equal check plane 53. The cores of the planes 50–53 are addressed simultaneously with the corresponding positions of storage matrix 23. For that purpose the cores of planes 50–53 are wound in a manner known in the art so that core addressing of matrix 23 by X and Y switches 28 and 29 produces concurrent addressing of corresponding cores in planes 50–53. The function of the core planes 50, 52, and 53 is to record various functions occurring in the control system and printer apparatus for checking purposes to assure reliability of operation. The function of plane 51 is to record each memory compare equal signal for use in determining when print operation is to be terminated.

Figure 2:
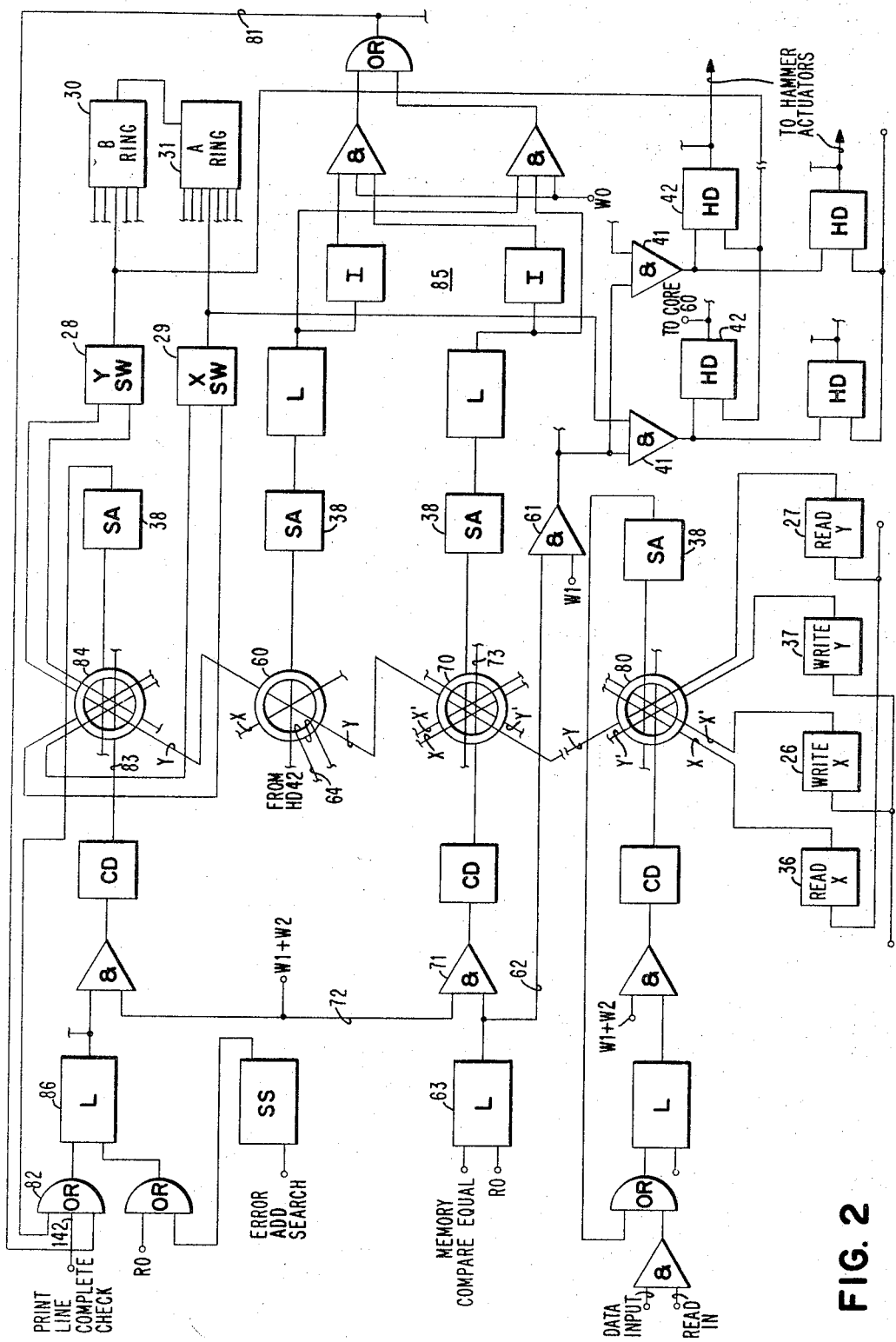
FIG. 2 is a logic diagram of a portion of the printer control circuit of FIG. 1 showing details of various control and checking circuits connected with the printer apparatus.

A first function which is recorded is the memory compare equal signal generated upon the occurrence of an identity as determined by compare circuit 48. The equal check plane 53 records a bit each time a memory compare equal signal occurs at circuit 48. As shown in FIG. 2, during each cycle of clock pulses, the read or R pulses occur before the corresponding write or W pulses. Accordingly, during a print cycle, each of the cores 70 in the equal check plane 53 is set to a 1 during the writing or W portion of the cycle, as in the read portion R0 of the clock cycle the latch 63 is reset, and the inhibit line 73 is ineffective to oppose the write lines. The occurrence of a memory compare equal signal during the print scan operation results in a setting of the compare equal latch 63 and energizing the inhibit line 73 to set the core 70 to 0 when the equal signal from compare circuit 48 indicates that the corresponding print head hammer driver HD should be fired.

A second function recorded is the firing of a hammer driver circuit 42. For this purpose, each of the cores in the hammer fire check plane 52 such as the core 60 is initially set to 0 by the X and Y read lines during the R portion of the print cycle. Whenever a particular hammer driver HD 42 is fired to operate its corresponding hammer, a signal is provided over conductor 64 to set the core 60 to a 1. Since the switch in core states occurs during the write portion of the clock cycle, this is after the cores have been read and compared. The conditions of the cores 70 and 60 for each print position are therefore compared in succession on the next print scan by a compare circuit 85 and since the cores should at all times be in opposite conditions, a compare signal results in an error, and this signal is applied over line 81 through OR circuit 82 to set a print error check latch 86 which results in setting the corresponding core 84 in the print check error plane 50.

Figure 3:
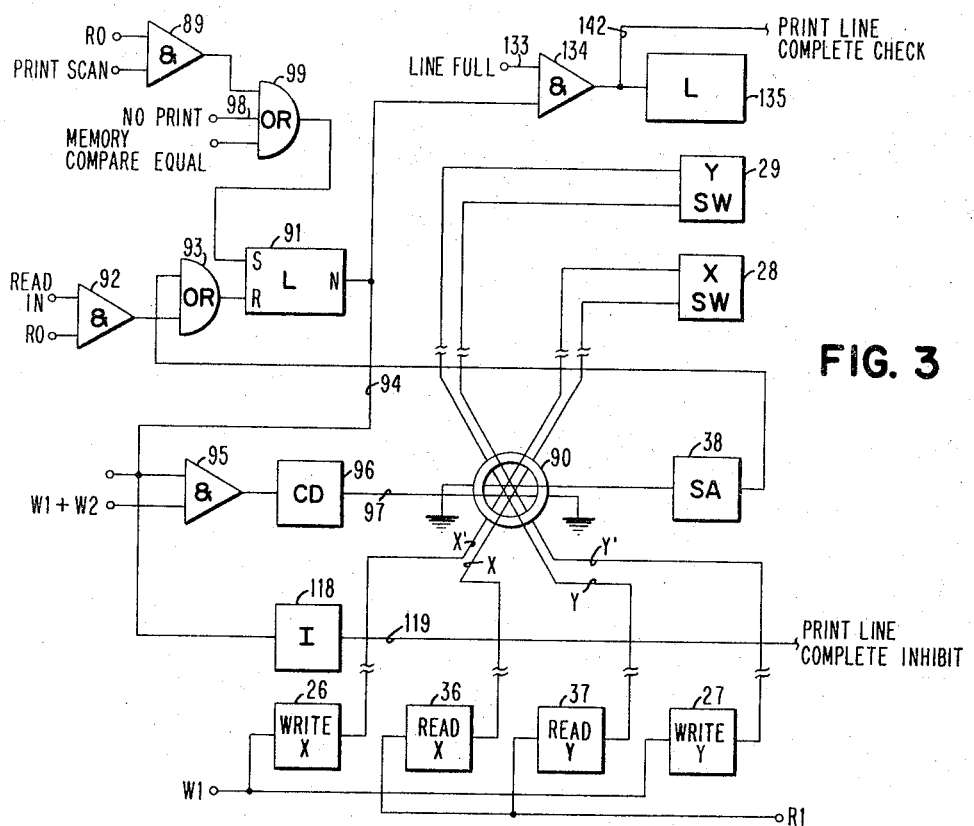
FIG. 3 is a logic diagram of a portion of the printer control circuit of FIG. 1 showing additional details of the cycle control circuitry.

In connection with the invention of the Bloom et al. application, the print cycle control plane 51 is used in combination with other control elements to be described as a means for terminating the print line cycle when all characters to be printed would have been printed. Further details of plane 51 are better understood by reference to FIG. 3 as well as FIG. 1. While only a single core 90 is shown in FIG. 3, it is understood that plural cores 90 are provided in a single plane matrix where a core 90 is provided for each position of storage in matrix 23.

During the read-in operation, all cores 90 in the cycle control plane 51 are switched to a zero state in the read portion of the clock cycle. As printable characters are recorded in a storage position of matrix 23 during the write portion of the clock cycle, the corresponding addressed core 90 in plane 51 is switched to the 1 state. In positions where a blank or unprintable character occurs, no switching of core 90 takes place. One arrangement whereby this can be accomplished is illustrated in FIG. 3 where print cycle control inhibit latch 91 is reset by an R0 clock pulse in combination with a Read-in signal applied through AND circuit 92 to OR circuit 93 and to the reset input of the latch 91. The resetting of latch 91 prevents energization of the inhibit driver 96. Thus the energization of the X and Y write lines by write drivers 26 and 27 selected by X and Y switches 28 and 29 under control of the A and B address rings 31 and 30 for writing data into matrix 23 coincidentally sets core 90 to a 1 state. If a blank or invalid character is to be entered into a storage position of matrix 23 a No-Print signal applied to line 98 sets the print cycle control inhibit latch 91 through OR circuit 99 and effects energization of the inhibit line 97 so as to prevent setting core 90 to a 1 state. Thus at the completion of read-in, every printable character stored in matrix 23 is represented by a switched core in a corresponding storage location in the print cycle control plane 51.

During the read-out portion of the print cycle, cores 90 previously switched to a 1 state on read-in will be reswitched to a 0 state for each memory compare equal signal from compare circuit 48 appearing on line 55 (FIG. 1). Referring again to FIG. 3, this is accomplished by a memory compare equal signal from compare circuit 48 to OR circuit 99 applied to the set input of latch 91. When all the previously switched cores 90 have been reswitched from 1 to the 0 state, plane 51 may be considered to be in Line Full condition indicating that all characters to be printed have been optioned for printing and the printing of a line of data should have been completed.

In accordance with the invention of the Bloom et al. application, the print cycle control plane is repeatedly monitored and when a Line Full condition occurs, the print operation is terminated. As shown in FIG. 1, the means for monitoring the condition of print cycle control plane 51 comprises an End Print Line control circuit 100 having an input connection to output line 94 from print cycle control inhibit latch 91. When End of Print Line circuit 100 senses a line full condition, a line full signal is generated to Carriage Control circuit 102 having control output connections to paper driver 21 to central processing unit and to OR circuit 82 connected to Inhibit latch 86 of Error Check plane 50.

Figure 4:
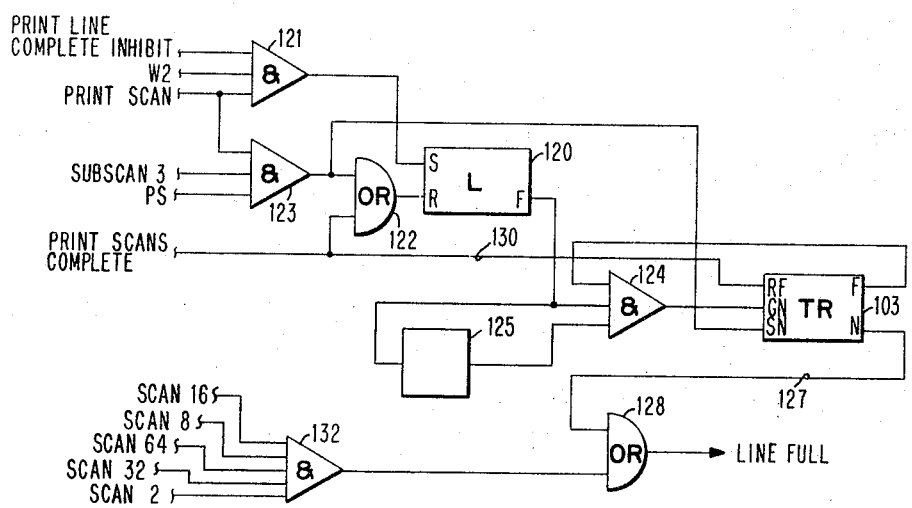
FIG. 4 is a logic diagram showing additional circuitry for providing the variable cycle control in combination with the cycle rate control feature of the present invention.

Further details of the End Print Line control 100 may be seen by reference to FIG. 4. A preferred embodiment of an End Print Line control 100, as shown in FIG. 4, comprises a Line Full Latch 120, and a Line Full Trigger 103 designed to generate a Line Full signal when all magnetic cores 90 in cycle control plane 51 have been switched to the same state during printing operation. In the preferred form, the monitoring of cycle control plane 51 is accomplished by having Line Full Latch 120 monitor the output line 94 of print cycle control inhibit latch 91. In a specific circuit arrangement, as shown in FIG. 4, the set input of Line Full Latch 120 is connected to the output of AND circuit 121 having a first input for receiving a Print Line Complete Inhibit signal from line 119 and Inverter 118 connected to line 94, a second input for receiving a W2 clock signal, and third input for a Print Scan signal indicative that the printer operation is in effect. The OFF output of Line Full Latch 120 is connected to AND circuit 124 having an output to the Gate ON input GN of Line Full Trigger 103. The OFF output of Line Full Latch 120 is also connected to AND circuit 124 through controls designated by box 125 for a purpose explained hereinafter. The reset input of Line Full Latch 120 is connected through OR circuit 122 to output of AND circuit 123 having inputs for receiving Print Scan, subscan 3, and PS signals. The output of AND circuit 123 is also connected to the SET ON input of Line Full Trigger 103. The OFF side output of Line Full Trigger 103 is connected to an input of AND circuit 124 and its ON side output is connected through OR circuit 128 having an output 129 for delivering a Line Full signal. As previously described, upon the occurrence of a Line Full condition in print cycle control plane 51 a signal is generated by End Print Line Control 100 to Carriage Control 102 and to the central processing unit.

Figure 6:
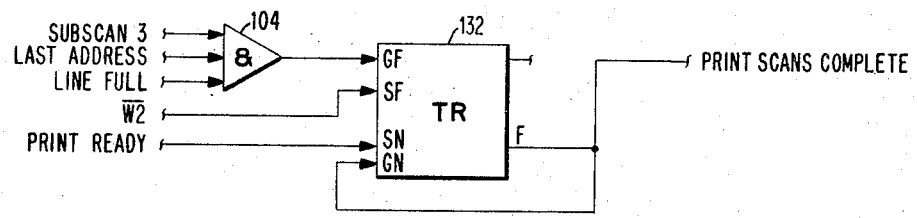
FIG. 6 is a logic circuit element used in connection with the circuitry of FIG. 4 for terminating printer operation.

The initiation of carriage control 102 and signal back to the central processing unit is accomplished with a Print Scans Complete signal generated at the ON side output of Print Scans Complete Trigger 132. As seen in FIG. 6, trigger 132 has its gate off input GF connected to the output of AND circuit 104 having inputs for receiving a Line Full signal from line 129 (FIG. 4). To assure that a print scans complete signal is not generated until all the storage positions of matrix 23 have been addressed, AND circuit 104 has an input for receiving a Last Address signal from A and B address rings 31 and 30 and a third input for receiving a subscan 3 signal. The Set OFF side SF of Trigger 132 has an input for a $\overline{W2}$ clock signal and the Set ON side SN has an input for a Print ready signal. The OFF output side of trigger 132 is connected to Gate ON side GN. In addition to being used for initiating operation of the carriage and central processing unit, the print scans signal is used for resetting Line Full Latch 120 and Line Full Trigger 103. For that purpose OR circuit 122 and the RESET OFF side RF of trigger 103 are connected to receive Print Scans Complete signals from trigger 132.

Figure 5:
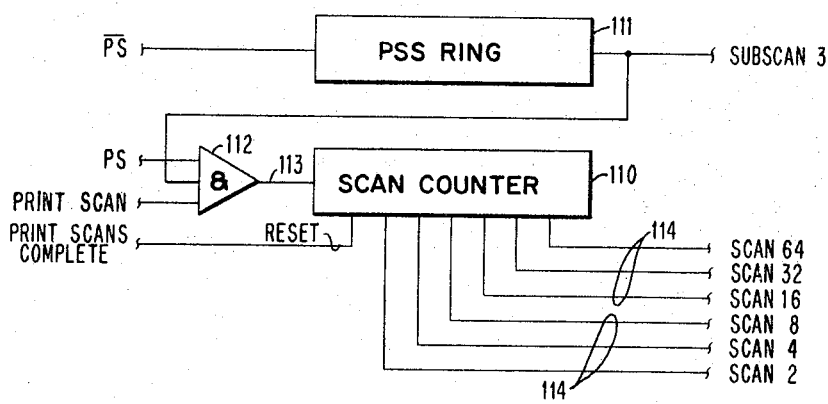
FIG. 5 is a logic diagram of a print scan counter device used for cycle rate control in the circuit of FIG. 1.

Insofar as the End Print Line control 100 has been described, it is readily appreciated that without further circuit elements the print cycle could be terminated at the end of any print scan in which a Line Full condition occurs in plane 51. However, in accordance with another feature of the Bloom et al. invention, End Print Line Control 100 is modified to provide a cycle rate control such that a predetermined minimum number of print scans must be obtained before print operations can be terminated. While this feature has been modified by the present invention, means for providing cycle rate control for indicating when the maximum number of scans are accomplished, may still be used and this includes the scan counter shown in FIG. 5. Scan counter 110 may be any well known counter circuit but preferably is a multi-stage binary counter adapted to advance in binary fashion each time a count pulse is applied to an input terminal thereof as is well known in the art. In the printer embodiment shown, in order to advance scan counter 110 once each print scan, a multi-stage Print subscan counter (PSS) ring 111 is used which converts three subscan pulses from the transducer 46 and pulse control 45 into a single print scan pulse. For that purpose PSS ring 111 is preferably a three stage closed ring having a single input to its first stage designed to advance the ring to successive stages in response to series of $\overline{PS}$ pulses from pulse control 45. An output from the last stage is connected to AND circuit 112 having an output connected to the input of scan counter 110. When the third $\overline{PS}$ pulse is applied to the PSS ring, its third stage is switched causing a subscan 3 signal to be applied to input of AND circuit 112. This signal along with a Print Scan Signal applied to AND circuit 112 gates the succeeding PS pulse to line 113 to advance counter 110. Scan Counter 110 is shown having output leads 114 from each of its various stages. Various ones or combinations of these leads 114 in combination with a selection device (not shown) may be used if desired to establish one or more predetermined count levels for scan counter 110. Scan counter 110 is also provided with a connection whereby it can be reset by Print Scans Complete signal from trigger 132 of FIG. 6.

In addition, scan counter 110 may be used to initiate an error checking function, although other means such as using a latch responsive to two consecutive home pulses without a Line Complete signal, may be used. For example, a complete line may have been printed, but due to an error in one or more of the operations, a Line Full condition was not recorded or detected and a Print Scans Complete signal may not be produced from the circuit of FIGS. 4, 5, and 6. In anticipation of this occurrence, print scan counter 110 is designed to count a predetermined maximum number of print scans which is greater than the maximum possible number of print scans which could occur in printing any line of data. A maximum —count output signal may be acquired by connecting plural stage outputs from scan counter 110 to AND circuit 132 to a second input of OR circuit 128. Thus when the scan counter 110 reaches its maximum count, a Line Full signal is generated on line 129. The Line Full signal in addition to initiating a Print Scans Complete signal from Trigger 132, also may be used for sampling the output from inhibit latch 91 of FIG. 3. For that purpose a Line Full signal is applied to AND circuit 134 which gates the output of latch 91 to an Error Stop Latch 135. If a print line complete check signal appears on line 142, a signal is applied through OR circuit 82 (as seen in FIG. 2) to set latch 86 of error check plane 50. An error signal produced may then be used in a conventional manner to produce an error condition which is sensed for error print out or printer shutdown.

Figure 8:
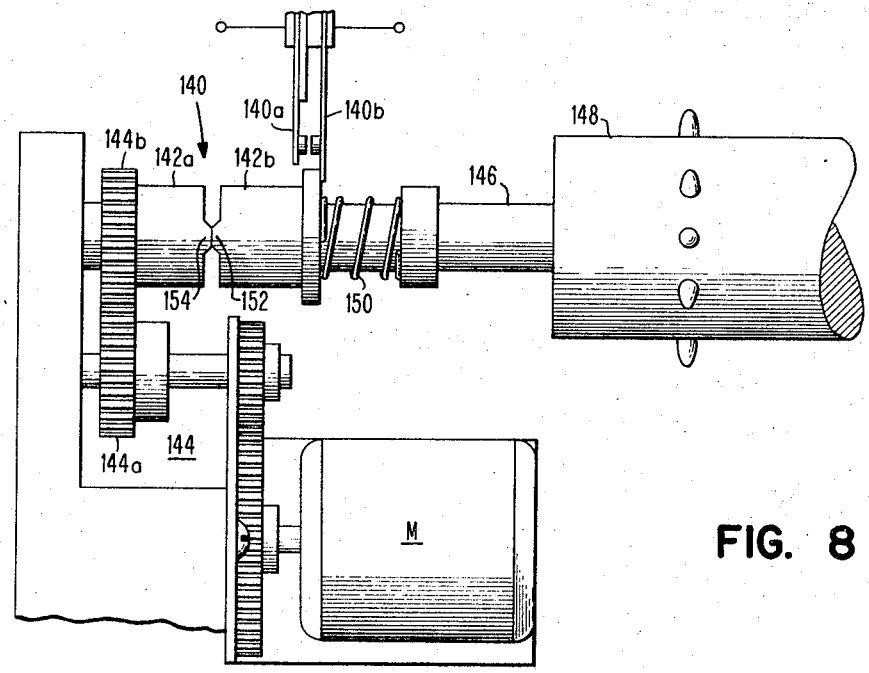
FIG. 8 is a schematic showing of a burst averaging control device for use with the circuitry of FIG. 4 in practicing the present invention.

Referring to FIG. 8, it will be seen that contacts 140a and 140b of print rate governor 140 may be utilized in controls 125 of FIG. 4 being connected in circuit with one input to AND circuit 124 for preventing an output signal from being developed if the contacts are separated. To provide for controlling the operation of these contacts to provide a flexible average print rate which may be exceeded momentarily, the contact member 140b may be actuated through the action of mating cam members 142a, 142b. Cam member 142a may be driven through a suitable gear train 144 from a constant speed motor M having a speed, for example, of 60 r.p.m. The cam member 142b may be slidably mounted on a shaft 146 connected to a tractor feed roll 148 which advances the record medium 18. The cam member 142b is normally biased to the left by means of a spring 150 and is provided with a cam projection 152 which cooperates with a similar projection 154 on the cam member 142a to move the cam member 142b to the right, thereby separating the contact member 140b from the cam member 142a. Since the document feed roll 148 advances the document 24 lines per revolution for an average print rate speed of 1400 lines per minute, it is desirable therefore to have the motor M drive the cam member 142a through gears 144a and 144b having 35 teeth and 36 teeth, respectively.

In normal operation, the contact members 140a and 140b will be closed, and the cam member 154 will be positioned slightly in advance of the cam member 152. When the feed roll 148 advances the document 18 at a rate of 1400 lines per minute, the cam projections 152 and 154 will maintain their relative angular positions as the cam members rotate. Should the document feed roll 148 be advanced at a rate greater than 1400 lines per minute, the projection 152 will rotate at a faster rate and will tend to catch up to the projection 154 by moving ahead in the direction of rotation. After a predetermined time, depending on the rate of advance of the document by the said roll 148 and the initial angular separation of the projection, the cam projections 152 and 154 will reach the mating position, as shown, whereupon the cam member 142b will be moved to the right separating the contact members 140a and 140b so as to prevent the AND circuit 124 from generating an output signal for the duration of the dwell of projections 152 and 154, and thus prevent the development of a Line Full signal from the End of Print Line control 100 for effecting operation of the carriage control 102 to advance to the paper or document drive.

Figure 9:
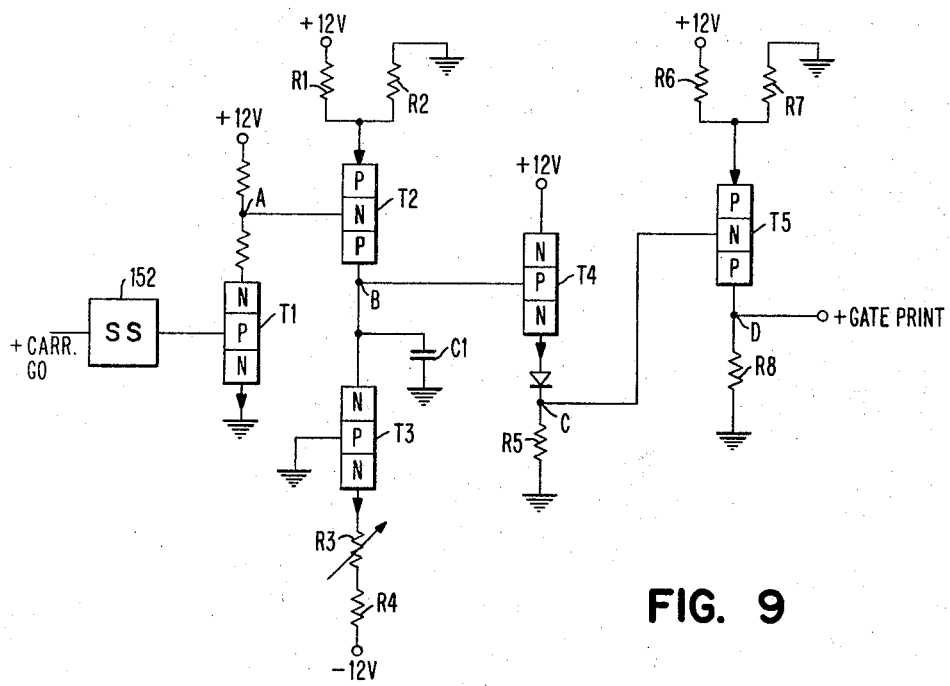
FIG. 9 is a schematic diagram of a burst averaging control circuit which may be used with the circuitry of FIG. 4 in practicing the invention in accordance with another embodiment thereof.

Referring to FIG. 9, it will be seen that in a circuit usable in control 125 a single shot 152 is utilized to respond to a signal from the Line Full Latch 120 to develop a pulse of predetermined length, having a duration, for example, of 3.35 milliseconds. This pulse is applied to a transistor T1 for effecting operation of a transistor T2 to connect a capacitor C1 to the positive terminal of a 12 v. source through resistors R1 and R2 for placing a predetermined charge on the capacitor C1 each time a signal is produced to effect advance of the carriage. A discharge circuit for the capacitor C1 is provided through a transistor T3 and resistors R3 and R4 to the negative terminal of a 12 v. source so as to provide a constant rate discharge circuit for the capacitor C1. A transistor T4 is connected to the terminal B between the transistors T2 and T3 to provide with resistor R5 an emitter follower connection for sensing the level at the terminal B and applying it to a sensing transistor T5 which is connected to the terminal point C of the transistor T4, to +12 through divider resistors R6 and R7, and to ground through collector resistor R8. The output from the control circuit may be taken from the collector terminal at point D of transistor T5 and applied as the third input to AND circuit 124 in FIG. 4 for controlling the average rate of carriage advance. This circuit assures that the average output rate for a preferred character set printer does not exceed a specified rate, but permits a higher print rate for several lines when chain position and characters to be printed permit. Thus a higher average output can be obtained than when a fixed number of print scans define the minimum line time.

Figure 10:
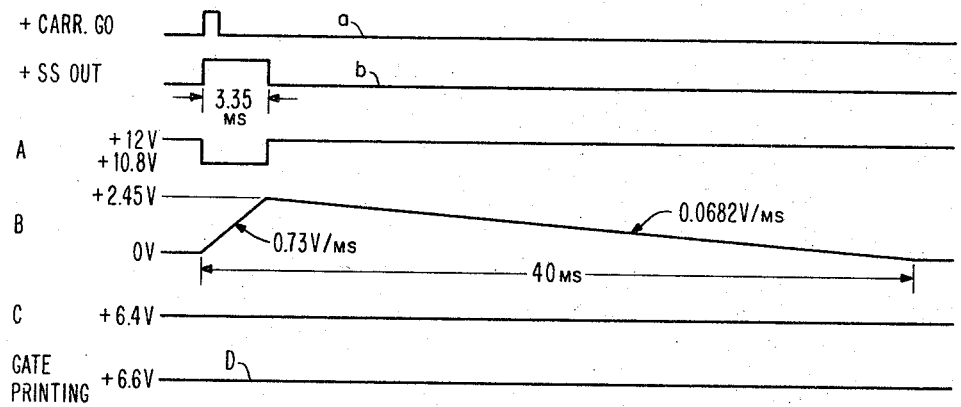
FIG. 10 is a showing of the waveforms in connection with the circuit of FIG. 9.
Figure 11:
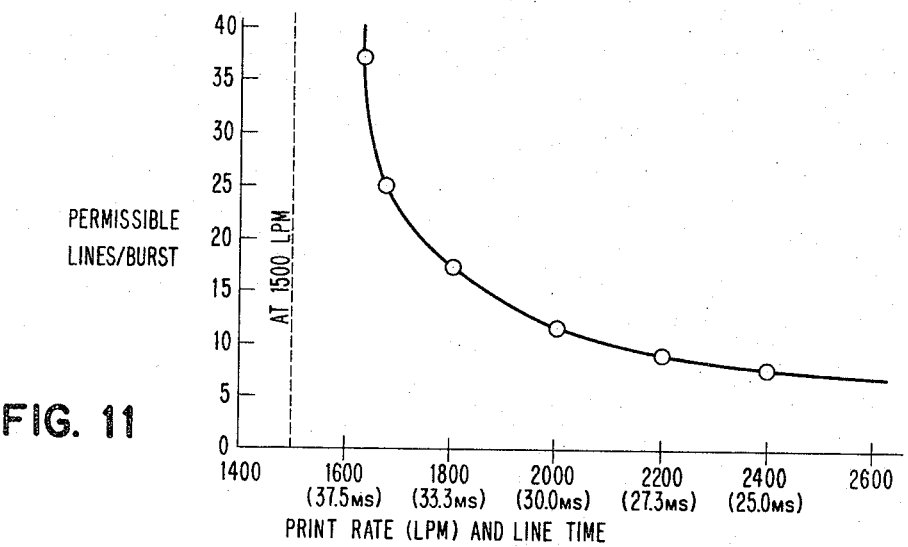
FIG. 11 shows a curve illustrating the relationship of the print rate and burst time when using the circuit of FIG. 9.
Figure 12:
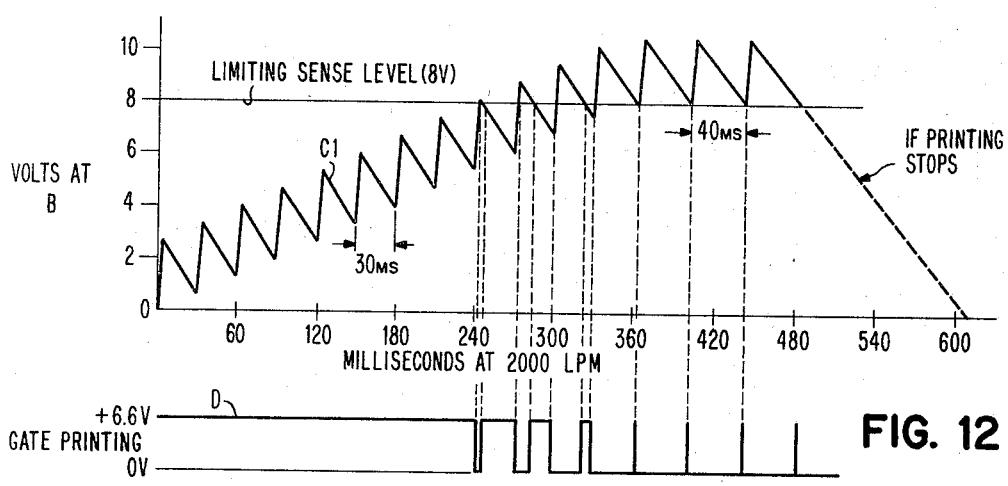
FIG. 12 shows the waveforms of FIG. 9 for a 2000-line per minute burst.

In the averaging circuit of FIG. 9, a fixed charge is placed on the capacitor C1, which may be of 8.2 mfd., from a gated current source consisting of a type 033 transistor T2, the resistor R1 having a value of 130 ohms and the resistor R2 having a value of 10K. The circuit is designed to charge the capacitor C1 at .73 v. per millisecond for a total added charge of 2.45 v. per carriage advance. The discharge rate is .0682 v. per millisecond requiring 36.65 milliseconds to totally remove the added charge as shown in FIG. 10. Thus at 40 milliseconds per line (1500 lines per minute), or slower, no net charge remains on the capacitor C1. At rates in excess of 1500 lines per minute, a net charge remains after each line. This charge accumulates until the sensing level of 8 v. is exceeded at point B. At this point T4 turns on and T5 turns off. The final output at D goes negative, preventing AND circuit 124 from developing an output signal until the voltage drops below 8 v., and thus preventing advance of the record medium. FIG. 11 shows the number of lines per burst required to force the rate back down to 1500 lines per minute. FIG. 12 shows the several wave forms resulting from a 2000 lines per minute burst. It will be noted that when the print rate drops below 1500 lines per minute, the net charge on the capacitor decreases, thus preparing for another burst.

*Operation*

To begin print operation, constant speed drive 16 is turned on to drive type chain 10 at a constant rate of travel in line with the row of print hammers 17. As the chain moves, magnetic disk 47 rotates to generate a PS timing pulse at the beginning of each subscan. The generation of a PS pulse corresponds with the arrival of the first of the plurality of characters on type elements 11 of chain 10 to be aligned in each subscan. With each PS pulse generated in transducer 46, PSS counter 44 is advanced to identify the above-mentioned first type character in the subscan character group. Thus PSS counter 44 keeps track of the type movement at all times when type chain 10 is in motion.

Upon signal from the printer that it is ready to print, a data processing unit will feed a line of data to be printed. The data is read character-by-character through data channel 24 and Data Input and Regenerate circuit 25 into the plural storage positions of data matrix 23 as previously described. As previously described on read-in of data, the cores 90 of cycle control plane 51 switched from an initial 0 to a 1 state when a printable character is stored in the corresponding storage location of matrix 23. Where a data storage position of matrix 23 has an unprintable character or blank, the cores 90 for those positions remain in 0 state. While in the described embodiment cores are switched from 0 to 1 in plane 51 when a printable character is registered in a storage location, it is readily appreciated that a reverse convention could be used wherein the cores 90 are switched from 1 to zero state when an unprintable or blank character is registered. Such convention might be useful for example where a negative logic technique is utilized. In any case, when a complete line of data is stored in matrix 23, a print scan signal is generated which among other things conditions the clock 32 to be turned on by a subsequent PS pulse from transducer 46. When the predetermined PS pulse is generated clock 32 is turned on and gates a series of pulses from oscillator 33 in repetitive fashion to form the clock cycle sequence of pulses shown in FIG. 7.

Figure 7:
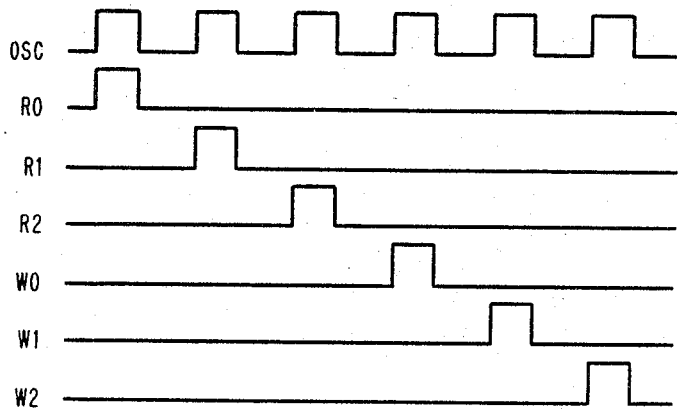
FIG. 7 is a timing chart showing the clock cycle for the basic timing operations used in the printer apparatus of FIG. 1.

Referring specifically to FIGS. 1, 3, and 7, the specific operation of print cycle control plane 51 will be more fully understood. At R0 time, and R0 clock pulse is gated through AND circuit 89 and OR circuit 99 to set cycle control plane inhibit latch 91. This turns latch 91 ON providing an input to AND circuit 95. At R1 time, the first subscan position of storage matrix 23 is addressed coincidentally with the first subscan hammer position in hammer select matrix 40. Simultaneously, an R1 clock pulse activates X and Y read drivers 36 and 37 to energize X and Y read windings of core 90. If core 90 is initially in 0 state, no read-out signal is produced, latch 91 remains ON. At W1 time, a W1 clock pulse is applied to X and Y write drivers 26 and 27 to energize X' and Y' write windings of core 90. At the same time, a W1 clock pulse is gated through AND circuit 95 to activate core drive 96 to energize inhibit winding 97. Thus when the X' and Y' write windings are energized, core 90 remains unswitched in the 0 state indicating that there is no data in the corresponding storage position to be printed. At the end of the W2 clock pulse, core driver 96 turns off to de-energize inhibit winding 97 and the next subscan storage position of matrix 23 and core plane 51 is addressed and the process repeated until all the subscan group of cores are interrogated.

If core 90 were in the 1 state, an R0 clock pulse sets latch 91 ON, providing an input to AND circuit 95. At R1 time, core 90 is switched from 1 to 0 state since inhibit winding remains de-energized. The switching of core 90 to 0 state generates a pulse in SA38 which resets cycle control inhibit latch 91 turning the latch OFF. Two possible operations can now occur. First, if the character on the chain 10 at the addressed hammer position is the same as the character stored in the corresponding storage position of matrix 23, a memory compare signal from compare circuit 48 at W0 time is gated through OR circuit 99 to again turn inhibit control latch 91 ON. Consequently, a W1 clock pulse turns on Core Driver 96 and inhibit winding 97 will be energized to inhibit reswitching of core 90 from 0 to 1 state. Second, if no memory compare equal signal is produced from compare circuit 48 when core 90 was initially in the 1 state, latch 91 would be turned OFF by a reset signal from SA38, but it would not be turned on again prior to W1 time. Thus a W1 clock pulse will not be gated through AND circuit 95, core driver 96 is not activated, and inhibit winding 97 remains de-energized and X and Y write drivers 26 and 27 reswitch core 90 to the 1 state indicating that the character to be printed has not yet come up for printing at the addressed printing position.

At the end of W2 time, the clock 32 repeats its pulse cycle sequence of FIG. 7 to cause the A and B rings 31 and 30 to address the next subscan storage position of matrix 23, and corresponding core positions of planes 50–53, and the hammer position of matrix 40, and character counter is advanced to generate the binary code signal representing the character on chain 10 coming into position at the addressed hammer position. For each address position, the cycle control plane 51 is interrogated for the conditions previously mentioned and the cores are reswitched if a memory compare equal signal is generated in the addressed position and the inhibit control latch was reset OFF by a read-out pulse at R1 time.

At the end of the first subscan, only a portion of all of the storage and hammer locations have been interrogated. This results from the fact that due to the 1.5 spacing ratio of the type characters only ⅓ of the hammers have had characters aligned therewith. Thus, the subscan process is repeated for a second portion of the storage locations. The $\overline{PS}$ pulse produced by transducer 46 through pulse control 45 again intiates the clock 32 operation, advances the rings 30 and 31 to address the cores and sets the PSS and character counters 42 and 43 to the appropriate count position. A $\overline{PS}$ pulse generated by pulse control 46 is applied to PSS ring 111 setting it in its second stage indicating that the first subscan has been completed. During the course of the second subscan, the inhibit control latch 91 is turned on by an R0 pulse and reset for every addressed position of plane 51 which has a core 90 in the 1 state during read-out. At the end of the second subscan, a $\overline{PS}$ pulse advances PSS ring from second to third stage indicating that the second subscan has been completed. A PS pulse from transducer 46 through pulse control initiates the third subscan process described above and the process of setting and resetting the latch 91 and switching addressed cores 90 in cycle control plane 51 is performed if proper condition occur. When the last core position of matrix 23 is addressed in the third subscan, a last address signal is generated by A and B address rings 31 and 30 for application to AND gate 104 in FIG. 6. Since the PSS ring is in the third stage, a subscan 3 signal is produced at the output of the last stage and applied to the input of AND gate 112 which gates the next PS pulse generated by transducer 46 to advance scan counter 110 to indicate that the first print scan has been completed. The subscan process is repeated until all cores 90 have been switched to 0 state to indicate a line full condition.

The line full condition is determined in the following manner:

Since inhibit control latch 91 is pulsed to be turned ON at the beginning of each cycle of clock 32, and is turned OFF in any clock cycle only if a 1 state is to be re-recorded in any core 90, the condition of the output of latch 91 at the end of each clock cycle serves as a means for determining whether anything remains to be printed. Thus if latch 91 is in OFF condition at the end of any clock cycle, all data has not been printed. Conversely, if the latch 91 is ON at the end of each clock cycle, a line full condition is concluded at the end of a Print Scan. The manner in which this is performed is understood by reference to FIGS. 3 and 4.

At the beginning of printing, Line Full latch 120 of FIG. 4 is turned OFF and Line Full Trigger 103 is switched so that the OFF side is up and ON side is down. At the beginning of each clock cycle as previously described inhibit control latch 91 is set ON. If the addressed core 90 is in 0 state, latch 91 stays ON and Print Line Complete Inhibit input from line 119 in FIG. 3 is down and a W2 sample pulse is not gated through AND circuit 121 and Latch 120 remains OFF. If any core 90 is in 1 state on read-out, latch 91 is reset OFF by a reset pulse from SA38. Now if no memory compare equal signal is generated for that core position, latch 91 will remain OFF causing a W2 sample pulse to be gated through AND circuit 121 to the set input of latch 120 turning it ON. Turning line full latch 120 ON drops its OFF output to AND circuit 124 causing the GN to go down. If in any clock cycle line full latch 120 is turned ON, it signifies that a data position in storage has not yet achieved a print option and therefore printing has not yet been completed. Also when line full latch 120 is switched ON, it remains ON for the remainder of the print scan. This prevents the Line Full Trigger 103 from being activated to produce a Line Full Signal. If during the course of a complete print scan all cores 90 of cycle control plane 51 not in 0 state are switched from 1 to 0 state by memory compare equal signals, the Line Full Latch 120 will remain OFF since the W2 sample pulses will not be gated by AND circuit 121 since at the arrival of each W2 sample pulse Print Line Complete Inhibit input from line 119 will be down. Thus at the end of the print scan in which latch 120 is OFF, a pulse generated from AND circuit 123 to the SN input of Line Full Trigger 103 will switch it so that the ON side output goes up. This causes Print Scan Complete Trigger 132 to be switched OFF when last address and subscan 3 occurs, generating a Print Scans Complete signal to terminate the print cycle and reset Line Full Latch 120 and Line Full Trigger 103 for the next print cycle.

In practicing cycle rate limitation according to the present invention, the line full condition monitoring of inhibit control latch 91 with line full latch 120 and line full trigger 103 is performed in the same way except that the contacts of print governor 140 of FIG. 8 are connected between the positive terminal of a voltage source and the third input of AND circuit 124. Thus, if at the end of any print scan when a subscan 3 pulse occurs, if Line Full latch 120 remains OFF but the print rate has been greater than the predetermined average value determined by the speed of the cam member 142a, the mating cam member 142b driven by the document feed roll 148 will activate the contact member 140b interrupting the circuit from the source and thus preventing AND circuit 124 from developing an output. Accordingly, line full trigger 103 will not be activated and the ON output thereof stays down. Likewise, if counter 110 does reach the predetermined count level prior to the occurrence of a line full condition, the cycle termination may not occur immediately since line full latch 120 may have been turned ON with the result that no line full signal is gated through AND circuit 124 to GN input of line full trigger 103. However, when the count level has been reached and the latch 120 remains OFF, a subscan 3 signal plus a PS signal from AND circuit 123 results in triggers 103 and 132 being successively activated as previously described to terminate the print cycle.

Likewise, in connection with the circuitry described in FIG. 9, it will be seen that AND circuit 124 can be gated only if the output at the terminal D of the circuit of FIG. 9 is up. If the print cycle control 51 indicates the end of a print line condition in much less than the usual number of scans for a number of successive print cycles, the charge on the capacitor C1 will be progressively increased as indicated by the curve C1 in FIG. 12 and when the voltage level at the terminal B exceeds the predetermined value, the voltage level at the output terminal D will drop thus preventing AND 124 from being gated until the voltage level at terminal D again rises, thus permitting momentary bursts of printing at greater than the average value of 1500 lines per minute, yet limiting the number of such bursts within a predetermined interval of time so as to protect the printer components.

While the invention has been particularly shown and described with reference to a preferred embodiment there of, it will be understood by those skilled in the art that the foregoing and other changes in form and details may be made therein without departing from the spirit and scope of the invention.

What is claimed is:

1. In a control circuit for a printer having carriage control means for advancing a document past a print line having a plurality of impression devices for forming impressions from character type on a moving type means at different ones of a plurality of print positions in accordance with data in data storage means and having compare means for generating signals for operating the impression devices in accordance with an identity between a character on the type means and a character in storage for each print position characterized by:

a cycle control storage device operated by signals from the compare means for indicating in which position characters are printed, means controlled by said cycle control storage device for producing a control signal to terminate a printing operation and effect operation of the carriage control means to advance the document in response to completion of printing in all positions to be printed, and print rate means including a first means based on a predetermined average carriage advance rate and a second means responsive to the actual carriage advance rate, said means cooperating jointly to prevent advance of the carriage when the actual rate exceeds the average rate for more than a predetermined time.

2. The combination defined in claim 1 characterized by the average print rate means comprising a stored energy device having a predetermined discharge rate and the actual print rate means comprises a charging means for the energy storage device.

3. The combination defined in claim 2 characterized by:

(a) the print rate means comprises a capacitor charged in accordance with said control signals and having a discharge circuit for discharging the capacitor at a rate proportional to the average permissible print rate, and (b) level sensing means for sensing when the charge on the capacitor exceeds a predetermined level.

4. The combination defined in claim 3 characterized by the capacitor being charged at .73 volt/ms. per carriage advance and the discharge rate being .0682 volt/ms. so that at 1500 lines per minute no net charge remains on the capacitor.

5. The combination defined in claim 1 wherein the first means comprises contact means in circuit with the carriage control means, an element rotatable at a predetermined speed based on the maximum average print rate and the second means comprises a rotatable member actuated by the carriage adavance means to said members being operable upon reaching a predetermined relative position to operate the contact means to interrupt the carriage advance circuit.

6. The combination defined in claim 4 wherein the first means comprises a rotatable member with an axial cam portion driven at a predetermined average rate, and the second means comprises a mating axially movable cam member having an axial protuberance, and the contact means is operated by axial movement of one of said cam members.

References Cited by the Examiner

UNITED STATES PATENTS

| | | | |
|---|---|---|---|
| 2,918,865 | 12/1959 | Wooding | 101—93 |
| 2,993,437 | 7/1961 | Demer et al. | 101—93 |
| 3,066,601 | 12/1962 | Eden | 101—93 |
| 3,099,206 | 7/1963 | Hemse | 101—93 |

WILLIAM B. PENN, *Primary Examiner.*